United States Patent [19]

Nakajima et al.

[11] Patent Number: 4,523,323
[45] Date of Patent: Jun. 11, 1985

[54] DIGITAL SIGNAL COMMUNICATION SYSTEM FOR MULTI-LEVEL MODULATION INCLUDING UNIQUE ENCODER AND DECODER

[75] Inventors: Masahiro Nakajima; Hiromi Hashimoto, both of Tokyo, Japan

[73] Assignee: Nippon Electric Co., Ltd., Tokyo, Japan

[21] Appl. No.: 465,789

[22] Filed: Feb. 11, 1983

[30] Foreign Application Priority Data

Feb. 15, 1982 [JP] Japan .................................. 57-23399

[51] Int. Cl.$^3$ ............................................. G06F 11/12
[52] U.S. Cl. ........................................ 375/37; 375/25; 371/37
[58] Field of Search ............... 375/25, 26, 37; 371/37, 371/38, 39, 40, 41, 42, 55, 56, 43, 44, 47; 340/347 DD

[56] References Cited

U.S. PATENT DOCUMENTS

| | | | |
|---|---|---|---|
| 3,311,878 | 3/1967 | Melas ................................... | 371/38 |
| 3,818,442 | 6/1974 | Solomon ............................... | 371/37 |
| 3,831,145 | 8/1974 | Meckenburg et al. ................ | 371/37 |
| 4,101,934 | 7/1978 | Fukuoka .............................. | 375/25 |
| 4,199,809 | 4/1980 | Pasahow et al. ..................... | 371/37 |
| 4,211,996 | 7/1980 | Nakamura ............................ | 371/37 |
| 4,276,647 | 6/1981 | Thacker et al. ..................... | 371/40 |
| 4,335,458 | 6/1982 | Krol .................................... | 371/40 |

Primary Examiner—Robert L. Griffin
Assistant Examiner—Stephen Chin
Attorney, Agent, or Firm—Laff, Whitesel, Conte & Saret

[57] ABSTRACT

A digital signal communication system has a transmitter for differentially converting first digital signals of n trains (n is an integer of 3 or larger) into a second digital signal of n trains comprising a plurality of words. Responsive to the second digital signals, a modulated signal is provided with $2^n(=N)$ modulation levels, which are transmitted. A receiver responds to the modulated signals, and demodulates them to provide signals of n trains corresponding to the second digital signals. This demodulated signal is differentially converted to provide n trains of signals corresponding to the first digital signals. The Hamming distance between two words of said second digital signals corresponding to the adjacent two modulation levels is either 1 or 2 and the numbers of the Hamming distances of 1 and 2 equal N/2, respectively.

9 Claims, 8 Drawing Figures

DIGITAL SIGNAL COMMUNICATION SYSTEM FOR MULTI-LEVEL MODULATION INCLUDING UNIQUE ENCODER AND DECODER

BACKGROUND OF THE INVENTION

The present invention relates to a digital signal communication system employing multi-phase or multi-phase multi-amplitude modulation. More particularly it relates to a digital signal communication system of the modulation level of $2^n(n \geq 3)$ which includes differential logic circuits on the transmission and the receiver sides respectively.

As disclosed in "Differential Encoding for Multiple Amplitude and Phase Shaft Keying Systems" (W. J. Weber), IEEE TRANSACTIONS ON COMMUNICATIONS, VOL. COM-26, No. 3, pp. 385-391, March 1978, PSK (Phase Shift Keying) modulation, QAM (Quadrature Amplitude Modulation), and the likes have been widely used in digital signal communication systems. In these systems, however, since there may arise phase ambiguities in the carrier waves regenerated at a receiver, a differential logic circuit is generally used in order to eliminate such phase ambiguities.

In the digital radio communication systems, on the other hand, a parity check system is used to monitor the channel quality by the use of an odd or even parity bit for one monitoring section of transmission signals. As to such check systems, reference should be made to; K. Nakagawa et al "W-4DG Code Converters", Reviews of the Electrical Communication Laboratories, NTT, Japan, Volume 23, Nos. 7-8, July-August, 1975, pp. 799-817.

The conventional systems employing the differential logic circuits, however, are detrimental in that one bit error in the transmission path would cause two bit errors in the received and decoded signals. Such an error would incapacitate the parity check, or greatly deteriorate the error rate. U.S. Pat. No. 4,182,988 discloses a parity check system, which enables parity checking even in such a system by counting alternate bits. This U.S. patent and the subject invention are assigned to the same assignee. The patented system is still incapable of checking all of the bits and of using the conventional monitoring circuits.

SUMMARY OF THE INVENTION

The object of the present invention is to provide a digital signal communication system which does not impair the advantage thereof even if differential logic conversion is effected. A further object of the invention is to effect parity checking of all the bits in a system which has a code constellation, with a lower error rate deterioration.

The present invention can provide a digital signal communication system comprising a transmitter having first means for differentially converting first digital signals of n trains (n is an integer of 3 or larger) into second digital signals of n trains comprising a plurality of words. Responsive to the second digital signals, a modulated signal is provided and transmitted with $2^n(=N)$ modulation levels. A receiver picks up the modulated signal and demodulates them to provide third digital signals of n trains corresponding to the second digital signals. The demodulated signals are differentially converted to provide fourth digital signals of n trains, corresponding to the first digital signals. The modulation and demodulation are characterized in that the Hamming distance between two words of the second digital signals, corresponding to the adjacent two modulation levels, is either 1 or 2 and that the numbers of the Hamming distances of 1 and 2 are equal to N/2, respectively.

BRIEF DESCRIPTION OF THE INVENTION

The present invention will now be described in more detail referring to the attached drawings, in which.

THE DETAILED DESCRIPTION OF THE INVENTION

Figure 1A:
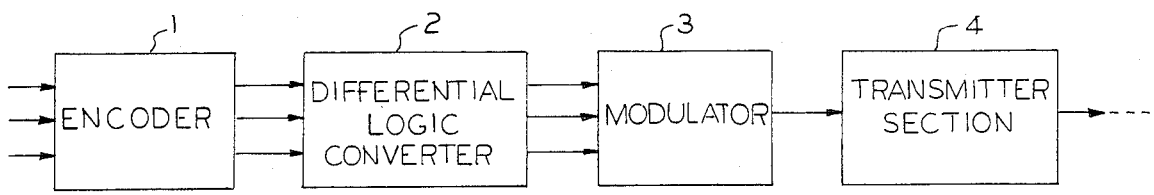
FIGS. 1A and 1B are block diagams showing a transmitter and a receiver of a digital signal communication system.
Figure 1B:
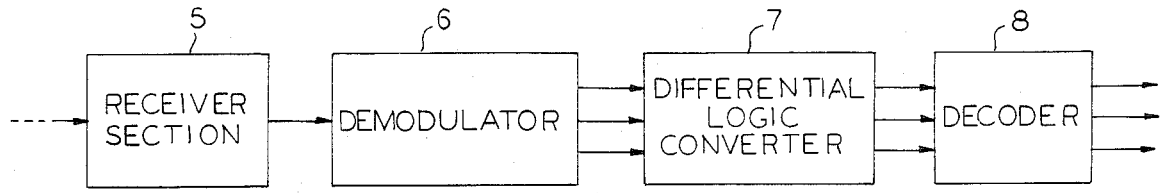

In FIGS. 1A and 1B, a transmitter comprises an encoder 1, a differential logic converter 2, a modulator 3 and a transmitter section 4, while a receiver comprises a receiver section 5, a demodulator 6, a differential logic converter 7 and a decoder 8.

The encoder 1 of the transmitter converts binary codes (for instance, a Gray code which is described hereinafter) of n trains (in this case 3 trains) into other binary codes (for instace, a natural binary code to be described hereinafter) of n trains. The transmitter also converts the same code differentially by a known differential logic converter 2 to feed it to a modulator 3. A word comprises a binary code of n trains of the same bit or time slot. The modulator 3 modulates a carrier wave with the differentially converted binary codes of the n trains to provide a modulated carrier wave of $2^n(=N)$ modulation levels (for instance, $2^n=8$ phase PSK modulation). The modulated carrier wave is fed to the transmission section 4, which frequency-converts and amplifies the modulated carrier wave, and transmits is through a radio or wire transmission path to the receiver section 5.

The receiver section 5 receives, frequency-converts, and amplifies the modulated carrier wave to feed it to the demodulator 6. The demodulator 6 demodulates the modulated carrier wave into binary codes of n trains. The differential logic converter 7 converts the demodulated binary codes of the n trains into binary codes (i.e. natural binary codes) of the n trains. The output of converter 7 corresponds to the output from the above-mentioned encoder 1. The decoder 8 converts it into binary codes of the n trains (i.e. Gray codes). The conversion effected by the differential logic converters 2 and 7 has been described by assuming it is conducted with natural binary codes because their circuit structures are simple. For details of an example of such systems, reference is made to Y. Tan et al, "2-GHz Band Digital Radio Equipment Employing 8-level PSK with Cosine Roll-off Spectrum Shaping", ICC '78, pp. 33.3.1–33.3.5.

Figure 2:
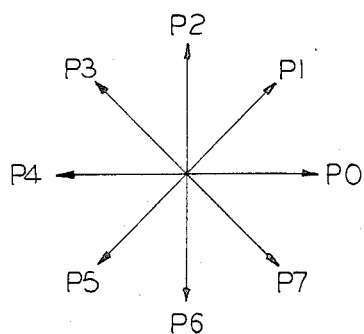
FIG. 2 is a vector diagram illustrating a signal constellation in a 8-phase PSK system.

FIG. 2 shows the constellation of the signals $P_0$–$P_7$ in the case of 8-phase PSK system. Tables 1 and 2 are the vector diagrams of conventional systems to show the 3 bit words ($G_1$–$G_2$) and ($N_0$–$N_2$) which are assigned to the signals $P_0$–$P_7$ of FIG. 2.

TABLE 1

|  | $G_2$ | $G_1$ | $G_0$ |
|---|---|---|---|
| $P_0$ | 0 | 0 | 0 |
| $P_1$ | 0 | 0 | 1 |
| $P_2$ | 0 | 1 | 1 |
| $P_3$ | 0 | 1 | 0 |
| $P_4$ | 1 | 1 | 0 |
| $P_5$ | 1 | 1 | 1 |
| $P_6$ | 1 | 0 | 1 |
| $P_7$ | 1 | 0 | 0 |

TABLE 2

|  | $N_2$ | $N_1$ | $N_0$ |
|---|---|---|---|
| $P_0$ | 0 | 0 | 0 |
| $P_1$ | 0 | 0 | 1 |
| $P_2$ | 0 | 1 | 0 |
| $P_3$ | 0 | 1 | 1 |
| $P_4$ | 1 | 0 | 0 |
| $P_5$ | 1 | 0 | 1 |
| $P_6$ | 1 | 1 | 0 |
| $P_7$ | 1 | 1 | 1 |

Table 1 illustrates an assignment of the so-called Gray codes to the signals $P_0$ to $P_7$. There, the code words have the known Hamming distance (between words corresponding to adjacent signals) which is constantly 1.

Figure 3:
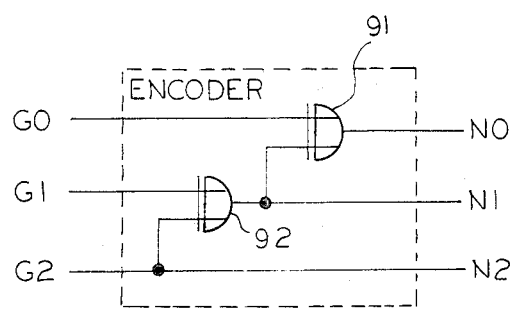
FIG. 3 shows an embodiment of an encoder which encodes Gray codes into natural binary codes.
Figure 4:
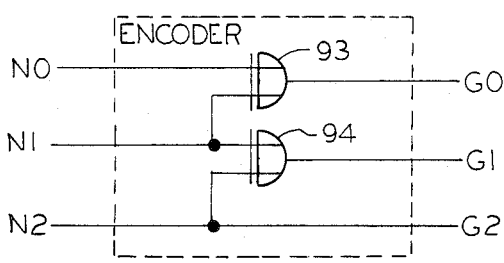
FIG. 4 shows an embodiment of a decoder which decodes natural binary codes into Gray codes.

FIG. 3 shows in detailed a circuit of the encoder 1 shown in FIG. 1A. Encoder 1 comprises Exclusive-OR gates 91 and 92 and converts the Gray codes into natural binary codes. FIG. 4 shows in detail a circuit of the decoder 8 shown in FIG. 1B. Decoder 8 comprises Exclusive-OR gates 93 and 94 and converts natural binary codes into Gray codes.

If 3-bit words are represented by Gray codes ($G_2$, $G_1$, $G_0$) and natural binary codes ($N_2$, $N_1$, $N_0$), encoding from Gray codes into natural binary codes, as effected by the circuit shown in FIG. 3, can be expressed by the formula (1);

$$\left. \begin{array}{l} N_0 = G_0 \oplus G_1 \oplus G_2 \\ N_1 = G_1 \oplus G_2 \\ N_2 = G_2 \end{array} \right\} \quad (1)$$

wherein the symbol $\oplus$ denotes "exclusive OR".

Encoding from the natural binary codes into Gray codes, as effected by the circuit shown in FIG. 4, is expressed by the formula (2);

$$\left. \begin{array}{l} G_0 = N_0 \oplus N_1 \\ G_1 = N_1 \oplus N_2 \\ G_2 = N_2 \end{array} \right\} \quad (2)$$

Table 2 shows an assignment of natural binary codes to the signals $P_0$ to $P_7$. In this case, the encoder 1 and the decoder 8, shown in FIGS. 1A and 1B, are not required. In the prior art, when the conventional method of the word assignment was applied to the differential logic converters, a one-bit error caused in the transmission path inevitably caused the error of two bits in the regenerated or decoded signals in Gray codes shown in Table 1; therefore the above-mentioned parity checking cannot be applied or, even if applied, cannot be fully effective. In the case of the natural binary codes shown in Table 2, the Hamming distance may take the value of 3, and the error rate was greatly deteriorated.

The present invention aims at obviating these problems and is characterized in that the Hamming distances between adjacent words in the digital signal communication system take the value of either 1 or 2-substantially half of these distances are 1 while the other half are 2. The merit in the differential code conversion is not impaired. The parity check method can be applied, and the deterioration of the error rate can be reduced.

TABLE 3

|  | $X_2$ | $X_1$ | $X_0$ |
|---|---|---|---|
| $P_0$ | 0 | 0 | 0 |
| $P_1$ | 0 | 0 | 1 |
| $P_2$ | 0 | 1 | 0 |
| $P_3$ | 0 | 1 | 1 |
| $P_4$ | 1 | 1 | 0 |
| $P_5$ | 1 | 1 | 1 |
| $P_6$ | 1 | 0 | 0 |
| $P_7$ | 1 | 0 | 1 |

Table 3 shows an assignment of 3-bit codes (or words) to the signals $P_0$ to $P_7$ according to the present invention. The Hamming distance between words corresponding to the adjacent signals is either 1 or 2. One half of the 8 adjacent signal combinations have the Hamming distance of 1 while the other half have the Hamming distance of 2.

Figure 5:
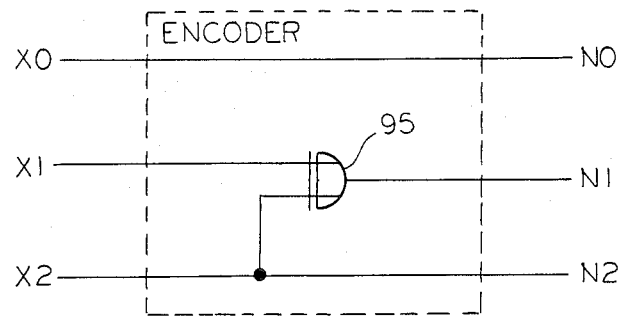
FIG. 5 illustrates an embodiment of an encoder which converts codes of the present invention into natural binary codes.
Figure 6:
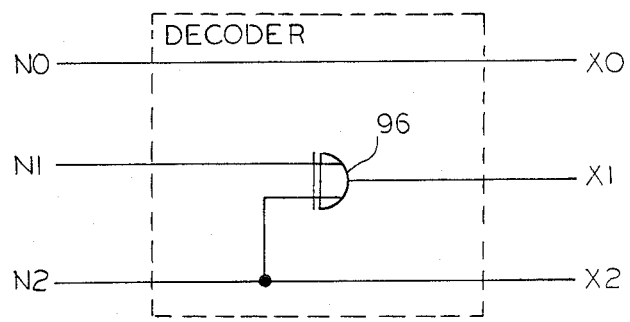
FIG. 6 shows an embodiment of a decoder which decodes natural binary codes into codes of present invention.

FIG. 5 shows a detailed circuit of the encoder of FIG. 1, which comprises an Exclusive-OR gate which converts the codes ($X_0$, $X_1$, $X_2$) of present invention into natural binary codes ($N_0$, $N_1$, $N_2$). FIG. 6 indicates a detailed circuit of the decoder of FIG. 1, which comprises an Exclusive-OR gate which converts natural binary codes ($N_0$, $N_1$, $N_2$) into the codes ($X_0$, $X_1$, $X_0$) of the present invention. More particularly, the encoding from the present invention codes ($X_0$, $X_1$, $X_2$) into the natural binary codes ($N_0$, $N_1$, $N_2$), as effected by the circuit shown in FIG. 5, can be expressed by the formula (3);

$$\left. \begin{array}{l} N_0 = X_0 \\ N_1 = X_1 \oplus X_2 \\ N_2 = X_2 \end{array} \right\} \quad (3)$$

Decoding from the natural binary codes ($N_0$, $N_1$, $N_2$) into the codes ($X_0$, $X_1$, $X_2$), as effected by the circuit of FIG. 6, can be expressed by the formula (4);

$$\left. \begin{array}{l} X_0 = N_0 \\ X_1 = N_1 \oplus N_2 \\ X_2 = N_2 \end{array} \right\} \quad (4)$$

Figure 7:
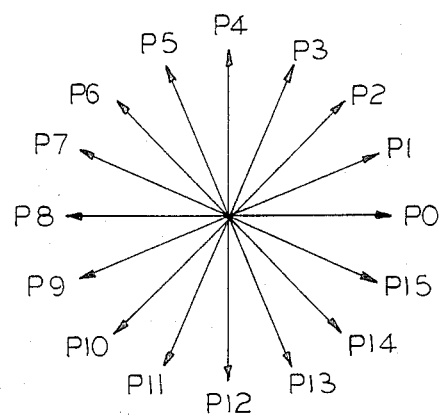
FIG. 7 is a vector diagram showing a signal constellation in a 16-phase PSK system.

The present invention provides a digital signal communication system for the transmitter/receiver with a differential logic conversion circuits. The Hamming distance between two words corresponds to the adjacent levels, to take either the value 1 or the value 2. For a 16-phase PSK system, the two types of distance are substantially equal in number. A code assignment according to the present invention is shown in Table 4 which assigns 4-bit codes (or words) to signals $P_0$ to $P_{15}$ shown in FIG. 7. As is obvious from Table 4. One half of the 16 adjacent signal combinations have the Hamming distance of 1 while the other half have the Hamming distance of 2.

TABLE 4

|  | $X_3$ | $X_2$ | $X_1$ | $X_0$ |
|---|---|---|---|---|
| $P_0$ | 0 | 0 | 0 | 0 |
| $P_1$ | 0 | 0 | 1 | 0 |
| $P_2$ | 0 | 0 | 0 | 1 |
| $P_3$ | 0 | 1 | 0 | 0 |
| $P_4$ | 0 | 1 | 0 | 1 |
| $P_5$ | 0 | 0 | 1 | 1 |
| $P_6$ | 0 | 1 | 1 | 1 |
| $P_7$ | 0 | 1 | 1 | 0 |
| $P_8$ | 1 | 1 | 1 | 1 |
| $P_9$ | 1 | 1 | 1 | 0 |
| $P_{10}$ | 1 | 0 | 1 | 1 |
| $P_{11}$ | 1 | 1 | 0 | 1 |
| $P_{12}$ | 1 | 1 | 0 | 0 |
| $P_{13}$ | 1 | 0 | 0 | 1 |
| $P_{14}$ | 1 | 0 | 1 | 0 |
| $P_{15}$ | 1 | 0 | 0 | 0 |

Because of its unique structure the system according to the present invention does not impair the effect of the differential logic conversion even if it is employed therefor. The system is structured in a manner to generate a one-bit error and a two-bit error corresponding to an error caused in the transmission path, thereby reducing a probability to cause odd number errors and even number errors by ½ without impairing the performance in the parity checking. Since the Hamming distance is restricted to either 1 or 2, the error rate cannot deteriorate greatly.

What is claimed is:

1. A digital signal communication system comprising transmitter means having first means for differentially converting first digital signals of n trains (n is an integer of 3 or larger) into second digital signals of n trains comprising a plurality of words, second means responsive to said second digital signals for providing a modulated signal with $2^n(=N)$ modulation levels, third means for transmitting said modulated signal, receiver means having fourth means for receiving said modulated signal, fifth means for demodulating the output from said fourth means to provide third digital signals of n trains corresponding to said second digital signals, and sixth means for differentially converting said third digital signals of n trains to provide fourth digital signals of n trains corresponding to said first digital signals, the second and third means being characterized in that the Hamming distance between two words of said second and third digital signals corresponding to two adjacent modulation levels is either 1 or 2 and each of the Hamming distance of 1 and of 2 is equal to N/2.

2. A process for transmitting information comprising the steps of:
   (a) accepting incoming information data in a form of a bit stream of binary words;
   (b) converting said information data of step (a) into a unique encoding having a bit stream of binary words separated by Hamming distances which are equally divided between "1" and "2", each word comprising bits equal to or greater than "3";
   (c) transmitting said uniquely encoded signals to a distant location; and
   (d) reconverting said uniquely encoded signals into a information data at said distant location.

3. The process of claim 2 wherein said unique encoding of steps (b) and (d) is described by the following Table:

|  | $X_2$ | $X_1$ | $X_0$ |
|---|---|---|---|
| $P_0$ | 0 | 0 | 0 |
| $P_1$ | 0 | 0 | 1 |
| $P_2$ | 0 | 1 | 0 |
| $P_3$ | 0 | 1 | 1 |
| $P_4$ | 1 | 1 | 0 |
| $P_5$ | 1 | 1 | 1 |
| $P_6$ | 1 | 0 | 0 |
| $P_7$ | 1 | 0 | 1 | wherein $X_0 \ldots X_2$ are binary bits and $P_0 \ldots P_7$ are eight distinctive phase angles.

4. The process of claim 3 wherein step (c) comprises the added step of modulating the unique code into eight distinctive phase angles identified by the notations $P_0 \ldots P_7$ where each of said eight phases is separated from its neighboring phases by 45°.

5. The process of claim 2 wherein said unique encoding of steps (b) and (d) is described by the following Table:

|  | $X_3$ | $X_2$ | $X_1$ | $X_0$ |
|---|---|---|---|---|
| $P_0$ | 0 | 0 | 0 | 0 |
| $P_1$ | 0 | 0 | 1 | 0 |
| $P_2$ | 0 | 0 | 0 | 1 |
| $P_3$ | 0 | 1 | 0 | 0 |
| $P_4$ | 0 | 1 | 0 | 1 |
| $P_5$ | 0 | 0 | 1 | 1 |
| $P_6$ | 0 | 1 | 1 | 1 |
| $P_7$ | 0 | 1 | 1 | 0 |
| $P_8$ | 1 | 1 | 1 | 1 |
| $P_9$ | 1 | 1 | 1 | 0 |
| $P_{10}$ | 1 | 0 | 1 | 1 |
| $P_{11}$ | 1 | 1 | 0 | 1 |
| $P_{12}$ | 1 | 1 | 0 | 0 |
| $P_{13}$ | 1 | 0 | 0 | 1 |
| $P_{14}$ | 1 | 0 | 1 | 0 |
| $P_{15}$ | 1 | 0 | 0 | 0 | wherein $X_0 \ldots X_3$ are binary bits and $P_0 \ldots P_{15}$ are sixteen distinctive phase angles.

6. The process of claim 5 wherein step (c) comprises the added step of modulating the unique code into sixteen distinctive phase angles identified by the notations $P_0 \ldots P_{15}$ where each of said sixteen phases is separated from its neighboring phases by 22.5°.

7. A process for transmitting information comprising the steps of:
   (a) converting incoming information data having a bit stream of binary words into unique binary words separated by Hamming distances which are divided equally between "1" and "2", each word comprising bits equal to or greater than 3;
   (b) converting unique binary words into differentially encoded binary words;
   (c) transmitting said differentially encoded binary words to a distant location; and
   (d) reconverting said differentially encoded binary words into unique binary words and then into said information data.

8. A process for transmitting information comprising the steps of:

(a) converting incoming information data having a bit stream of binary words into unique encoded binary words separated by Hamming distances which are equally divided between "1" and "2", each word comprising n bits equal to or greater than 3;
(b) assigning said uniquely encoded binary words to $2^n(=N)$ distinctive phase angles where each of said $2^n$ distinctive phase angles is separated from its neighboring phases by 360°/N, t provide a modulation signal;
(c) transmitting said modulation signal to a distant location; and
(d) reconverting said modulation signal into uniquely encoded binary words at said distant location and then into said information data.

9. A process for transmitting information comprising the steps of:
(a) converting first signals having a bit stream of binary words into second signals having unique binary words separated by Hamming distances between "1" and "2", each word comprising n bits equal to or greater than 3;
(b) differentially converting said second signals into third signals;
(c) converting said third signals into modulation signals having $2^n(=N)$ distinctive phase angles where each of said $2^2$ distinctive phase angles is separated from its neighboring phases by 360°/N;
(d) transmitting said modulation signal to a distant location;
(e) reconverting said modulation signal into fourth signals corresponding to said third signals at said distant location;
(f) differentially reconverting said fourth signals into fifth signals corresponding to said second signals at said distant location; and
(g) reconverting said fifth signals into sixth signals corresponding to said first signals.

* * * * *